(12) United States Patent
Moutarlier (10) Patent No.: US 8,743,884 B2
(45) Date of Patent: *Jun. 3, 2014

(54) TCP ACKNOWLEDGE FOR AGGREGATED PACKET

(75) Inventor: Philippe Moutarlier, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 12/884,740

(22) Filed: Sep. 17, 2010

(65) Prior Publication Data

US 2011/0026402 A1    Feb. 3, 2011

Related U.S. Application Data

(63) Continuation of application No. 11/495,390, filed on Jul. 28, 2006, now Pat. No. 7,801,044.

(60) Provisional application No. 60/797,444, filed on May 4, 2006.

(51) Int. Cl.
*H04L 12/28* (2006.01)

(52) U.S. Cl.
USPC ............................ 370/394; 370/236; 370/428

(58) Field of Classification Search
USPC .............. 370/229, 230, 230.1, 231, 235, 236, 370/428, 477, 522, 394
See application file for complete search history.

(56) References Cited

U.S. PATENT DOCUMENTS

| | | | | |
|---|---|---|---|---|
| 6,263,001 | B1* | 7/2001 | Banks | 370/522 |
| 6,424,626 | B1* | 7/2002 | Kidambi et al. | 370/236 |
| 6,611,535 | B2* | 8/2003 | Ljungqvist | 370/477 |
| 6,765,885 | B2* | 7/2004 | Jiang et al. | 370/328 |
| 6,862,264 | B1* | 3/2005 | Moura et al. | 370/229 |
| 7,116,667 | B2* | 10/2006 | Jiang et al. | 370/394 |
| 2003/0012212 | A1* | 1/2003 | Earnshaw et al. | 370/428 |
| 2003/0043744 | A1* | 3/2003 | Lu et al. | 370/236 |
| 2004/0100979 | A1* | 5/2004 | Mandin et al. | 370/402 |
| 2004/0264370 | A1* | 12/2004 | Moon et al. | 370/229 |
| 2006/0067222 | A1* | 3/2006 | Endoh | 370/231 |
| 2006/0176862 | A1* | 8/2006 | Ishimori et al. | 370/338 |

* cited by examiner

*Primary Examiner* — Christopher Grey
(74) *Attorney, Agent, or Firm* — Garlick & Markison; Jessica W. Smith (57) ABSTRACT

A method and apparatus according to one embodiment of the invention are operable to detect the accumulation of redundant ACKs (acknowledgment signals) in a queue for streaming data packet units, and to delete a portion of the redundant ACKs to improve transmission efficiencies. In one embodiment, only the most relevant ACK is kept before the ACKs are processed for transmission. In an alternate embodiment, a ratio of defined that limits the maximum number of redundant ACKs that may be deleted. This ratio is based upon a transmission window size. The teachings of the present disclosure may also be applied to flow control in a more general sense in which a plurality of redundant signals responses are being transmitted after being aggregated.

20 Claims, 6 Drawing Sheets

FIG. 7

TCP ACKNOWLEDGE FOR AGGREGATED PACKET

CROSS REFERENCE TO RELATED PATENTS

The present U.S. Utility Patent Application claims priority pursuant to 35 U.S.C. §120, as a continuation, U.S. Utility Application Ser. No. 11/495,390, entitled "TCP ACKNOWLEDGE FOR AGGREGATED PACKET," filed Jul. 28, 2006, now issued as U.S. Pat. No. 7,801,044, which claims priority pursuant to 35 U.S.C. §119(e) to U.S. Provisional Application Ser. No. 60/797,444, entitled "TCP ACKNOWLEDGE FOR AGGREGATED PACKET," filed May 4, 2006, all of which are hereby incorporated herein by reference in their entirety and made part of the present U.S. Utility Patent Application for all purposes:

BACKGROUND

1. Technical Field of the Invention

This invention relates generally to communication systems and in particular to a transmitter operating at high data rates within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one or more antennas for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is essentially a single-input-single-output (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a communication system. For example, high data rates can be achieved with MIMO communications in comparison to SISO communications. However, most communication systems include legacy wireless communication devices (i.e., devices that are compliant with an older version of a wireless communication standard). As such, a transmitter capable of MIMO wireless communications should also be backward compatible with legacy devices to function in a majority of existing communication systems.

Typically, a transmitting device and a receiving device communicate utilizing conventional approaches that are intended to verify that data is successfully delivered through the communication medium to the receiving device as transmitted by the transmitting device. Such protocols are implemented to overcome interference of all types that are often present. Typically, a receiving device will provide a specified feedback signal or communication signal to the transmitting device to allow the transmitting device to become aware that the data is being received properly. Often, if the transmitter does not receive such feedback after a specified amount of data, the transmitting device either will stop transmitting or will begin to repeat prior transmissions.

Prior technology systems send redundant and useless information when a given signal or response is aggregated. For example, redundant response signals such as transmission control protocol (TCP) acknowledgment signals may aggregate in a queue prior to transmission from the receiving device to the transmitting device to inform the transmitting device that the frames associated with the responses in the queue were received correctly. As such, the transmission medium is used inefficiently. The redundant and useless information is transmitted nonetheless thereby wasting transmitter, channel, and receiver resources. This problem is more acute for fast medium communications. A need exists, therefore, for a system that is operable to reduce transmission inefficiencies to increase throughput rates.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
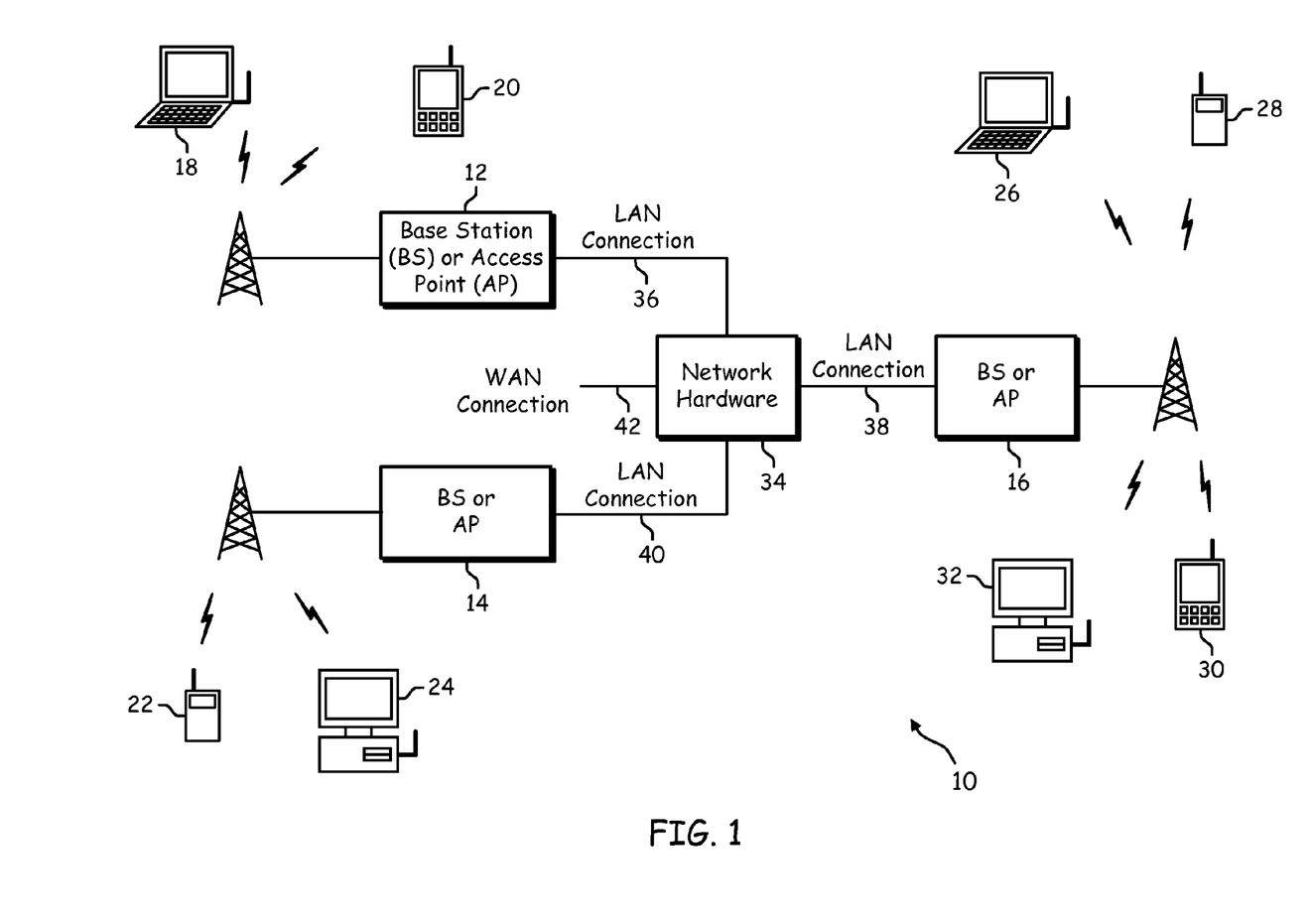
FIG. 1 is a schematic block diagram illustrating a communication system.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32, and/or cellular telephone hosts 22 and 28. The details of the wireless communication devices will be described in detail with reference to FIG. 2.

The base stations or access points 12-16 are operably coupled to the network hardware 34 via local area network connections 36, 38 and 40. The network hardware 34, which may be a router, switch, bridge, modem, system controller, or other similar device, provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. One or more of the wireless communication devices is operable to receive and process ingoing RF having any one of a plurality of transmission formats including associated bandwidths.

Figure 2:
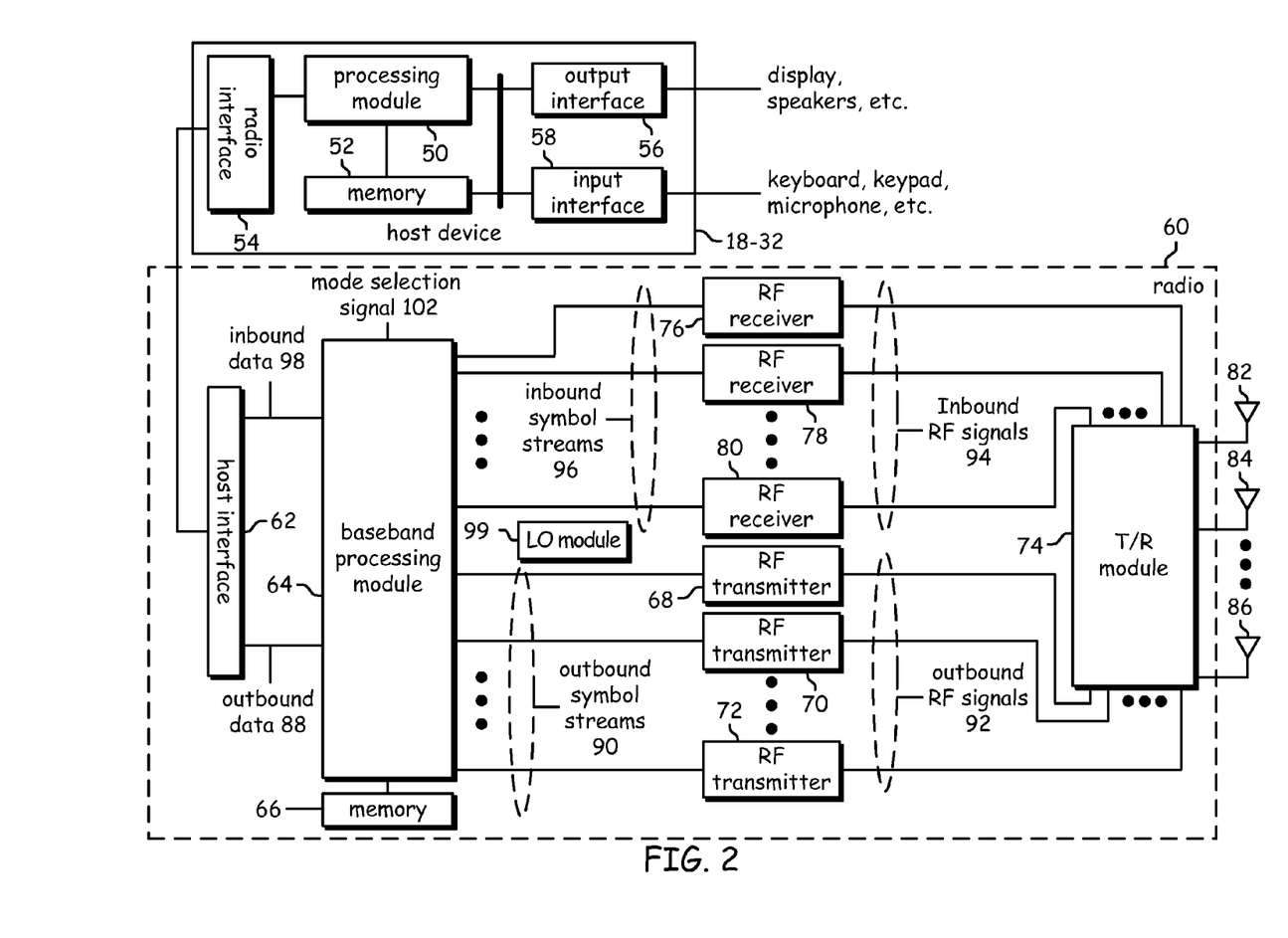
FIG. 2 is a schematic block diagram illustrating a wireless communication device that includes the host device and an associated radio.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, or other similar device, via the input interface 58 or may generate the data itself. For data received via the input interface 58, the processing module 50 is operable to perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80 and a local oscillation module 99. The baseband processing module 64, in combination with operational instructions stored in memory 66, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space, and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 101, produces one or more outbound symbol streams 90. The mode selection signal 101 indicates a particular mode of operation that is compliant with one or more specific modes of the various IEEE 802.11 standards. For example, the mode selection signal 101 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal 101 may indicate a particular type of modulation, which includes, but is not limited to, Barker Code Modulation, BPSK, QPSK, CCK, 16 QAM, and/or 64 QAM. The mode select signal 102 may also include a code rate, a number of coded bits per subcarrier (NBPSC), coded bits per Orthogonal Frequency Division Multiplexing (OFDM) symbol (NCBPS), and/or data bits per OFDM symbol (NDBPS). The mode selection signal 101 may also indicate a particular channelization for the corresponding mode that provides a channel number and corresponding center frequency. The mode select signal 102 may further indicate a power spectral density mask value and a number of antennas to be initially used for a SISO, SIMO, MISO or MIMO communication, and a corresponding space-time and/or space-frequency encoding mode.

The baseband processing module 64, based on the mode selection signal 101 produces one or more outbound symbol streams 90 from the outbound data 88. For example, if the mode selection signal 101 indicates that a single transmit antenna is being utilized for the particular mode that has been selected, the baseband processing module 64 will produce a single outbound symbol stream 90. Alternatively, if the mode select signal 102 indicates 2, 3, or 4 antennas, the baseband processing module 64 will produce 2, 3, or 4 outbound symbol streams 90 from the outbound data 88.

Depending on the number of outbound streams 90 produced by the baseband module 64, a corresponding number of the RF transmitters 68-72 will be enabled to convert the outbound symbol streams 90 into outbound RF signals 92. In general, each of the RF transmitters 68-72 includes a digital filter and upsampling module, a digital to analog conversion module, an analog filter module, a frequency up conversion module, a power amplifier, and a radio frequency bandpass filter. The RF transmitters 68-72 provide the outbound RF signals 92 to the transmit/receive module 74, which provides each outbound RF signal to a corresponding antenna 82-86.

When the radio 60 is in the receive mode, the transmit/receive module 74 receives one or more inbound RF signals 94 via the antennas 82-86 and provides them to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 converts the inbound symbol streams 96 into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

One feature of communication devices such as the exemplary devices described above is the ability to transmit message protocol data units (MPDUs). Conventional transmission protocol includes, however, a receiving unit transmitting acknowledgement signals ("ack") for each frame or MPDU of data received. When large aggregates of multiple MPDUs are used in a single stream TCP traffic, all ACKs for each MPDU inside the aggregate are generated and sent at the same time. However, only the last ACK is relevant making all the others redundant. The embodiments of such invention are operable to detect accumulation of such redundant ACKs, keeping only a subset of ACKs (at least one relevant one) before the ACKs are processed and sent to a radio front end for transmission to a device transmitting data to the communication device. By reducing the number of ACKs in the stream, user datagram protocol (UDP) rates for TCP traffic is increased.

Generally, the embodiments of the invention include detecting and deleting redundant ACKs before they actually transmitted. This is done at the network device driver level, after the TCP ACKs have been sent by the TCP stack or any device including remote devices that generate such ACKs. The inventive concepts therefore apply to any TCP traffic regardless of the source or type of device implementing the invention and regardless of the source of the ACKs.

The embodiments of the invention operate upon a queue of frames to be sent by the driver. Each time a new frame is added to the queue, the method according to one embodiment includes examining the frame and determine if the response is a pure TCP ACK of data length 0. If so, the current send queue is examined for a previous ACK corresponding to the same TCP stream to delete such redundant ACKs (or responses).

If a redundant response or ACK is found that satisfies an acknowledgment number or sequence number, progression, it is de-queued. The newest ACK is kept and remains queued. The acknowledgment number progression enforces that the acknowledgment number of the new ACK frame must be higher than the one to be discarded. This provision makes sure that duplicate or redundant ACKs can be transmitted as mandated by the TCP protocol.

Figure 3:
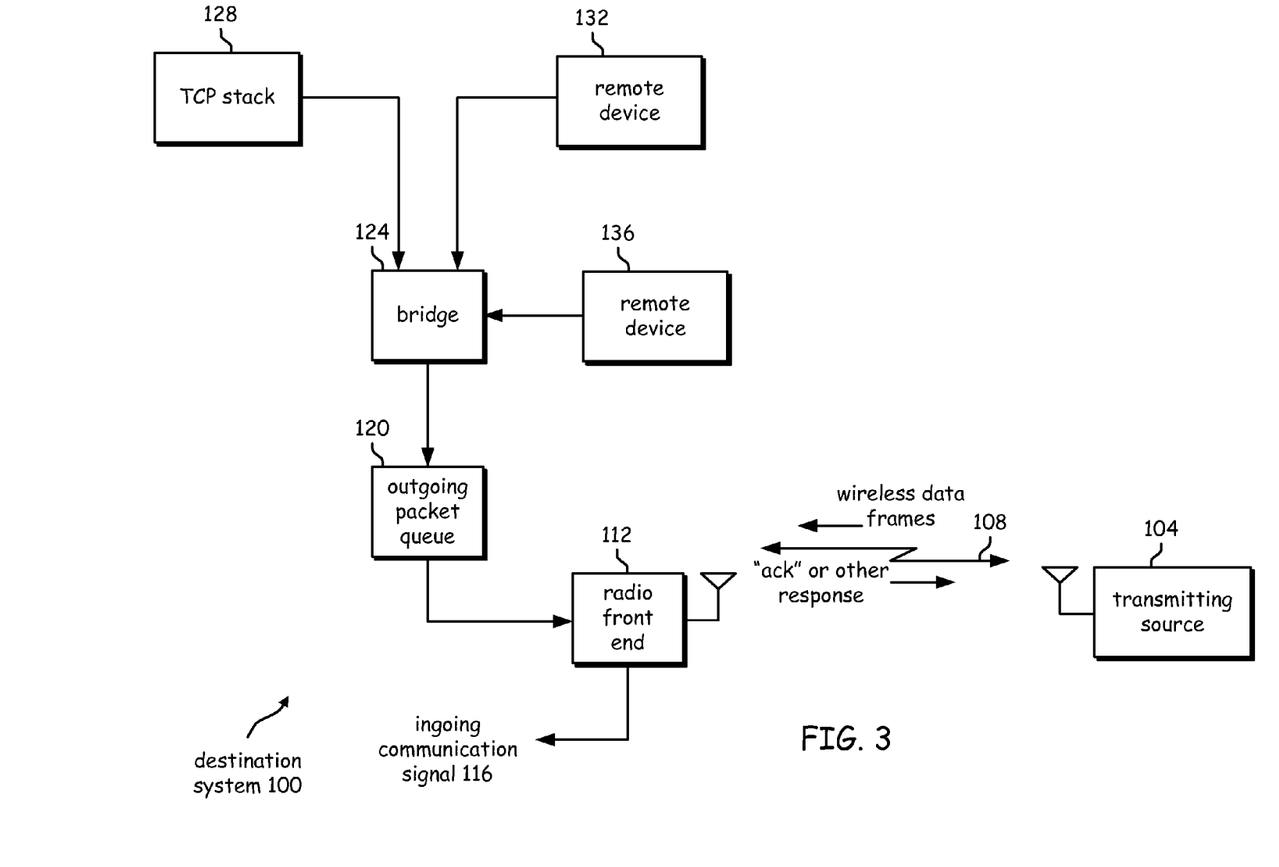
FIG. 3 is a functional block diagram according to one embodiment of the invention.

Along these lines, FIG. 3 illustrates a destination system operating according to one embodiment of the invention. Destination system 100, which is a wireless communication device in the described embodiment, is operating primarily as a receiver that is receiving wireless data frames or MPDUs from a transmitting source 104 by way of a wireless communication channel 108. A radio front end 112 receives the wireless data frames and provides ingoing communication signals 116 to intended devices formed as a part of or operatively coupled to system 100 (including remote devices). Responsive to the received data frames, system 100 transmits responses such as "ACKs" (received signal acknowledgments) from a radio front end 112 to the transmitting source 104 to acknowledge receipt of the wireless data frames. The radio front end 112 transmits the responses or ACKs as received from outgoing packet queue 120. For the purposes of the embodiment of FIG. 3, the responses will be described as "ACKs" but it should be understood that all types of responses may be included or used.

In the described embodiment, outgoing packet queue 120 receives the ACKs in a serial manner from a source, which, here, is a bridge 124. Bridge 124 is, functionally, a device operable to receive data from a plurality of sources including TCP stack 128, remote device 132, and remote device 136. For example, remote device 128 may comprise an Ethernet based data source. Alternatively, queue 120 may be connected directly to any one of devices 128-136.

The destination system 100 is operable to evaluate aggregated or queued ACKs within queue 120 to determine whether to and to remove (delete) any of the queued ACKs prior to transmission to the radio front end 112 for transmission to transmitting source 104. Generally, in one embodiment, system 100 evaluates data window size to determine a ratio of deleted ACKs to non-deleted ACKs. In an alternate embodiment, a fixed ratio is used for determining how many ACKs to delete. In yet another alternate embodiment, only the most recent ACK of an aggregate of queued ACKs is kept. The ACKs that are to be deleted are deleted from the outgoing packet queue 120 or other memory structure prior to delivery to the radio front end for transmission to transmitting source 104 by way of communication channel 108.

Figure 4:
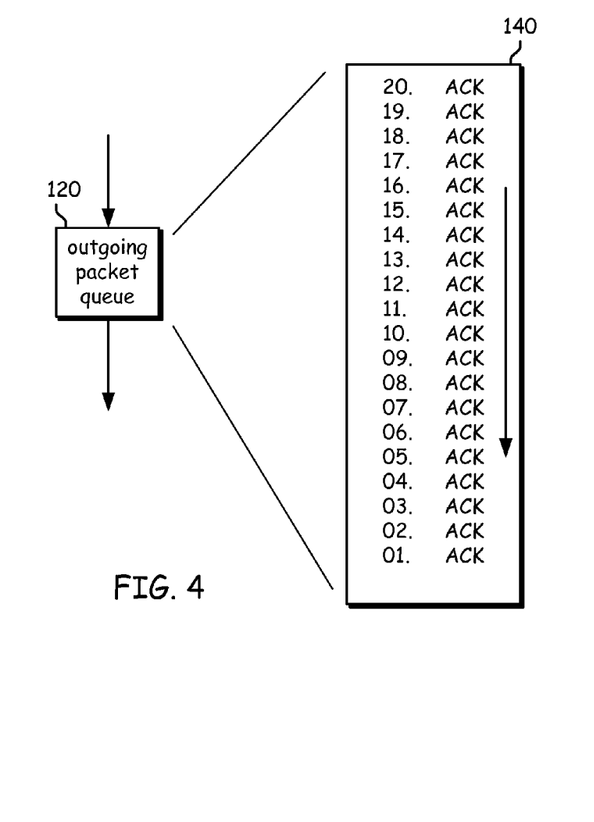
FIG. 4 is a diagram that illustrates queued data within an outgoing packet queue and operation thereof according to one embodiment of the invention.

FIG. 4 is a diagram that illustrates queued data within an outgoing packet queue and operation thereof according to one embodiment of the invention. As may be seen, outgoing packet queue 120 includes twenty queued ACKs numbered 1-20 in order received in a portion 140 of outgoing packet queue 120. In the example shown, each ACK is given a sequence number, which is illustrated here merely for exemplary purposes as a number 1-20. In actual implementations, a sequence number of a different form or magnitude is likely to be used. Further, while portion 140 shows only ACK responses, it should be understood that portion 140 may include other queued signals for transmission intermingled with the ACK responses. If such other responses do exist in an intermingled form, however, they are not relevant for purposes of this invention and thus are not shown.

Referring back to the ACKs of the outgoing packet queue 120, the ACK sequence number "20" is the most recent. Assuming all ACKs 1-20 are the same and have no data, ACKs 1-19 are deleted in one embodiment of the invention. In an alternate embodiment, a fixed ratio is used. For example, for a fixed ratio of 16:1, ACKs 19-04 and 02-01 would be deleted leaving ACKs 20 and 03. In yet another embodiment, the ratio is dynamically determined based upon a data window size that may, itself, be based upon several factors including data source/destination, transmission rate, etc.

Figure 5:
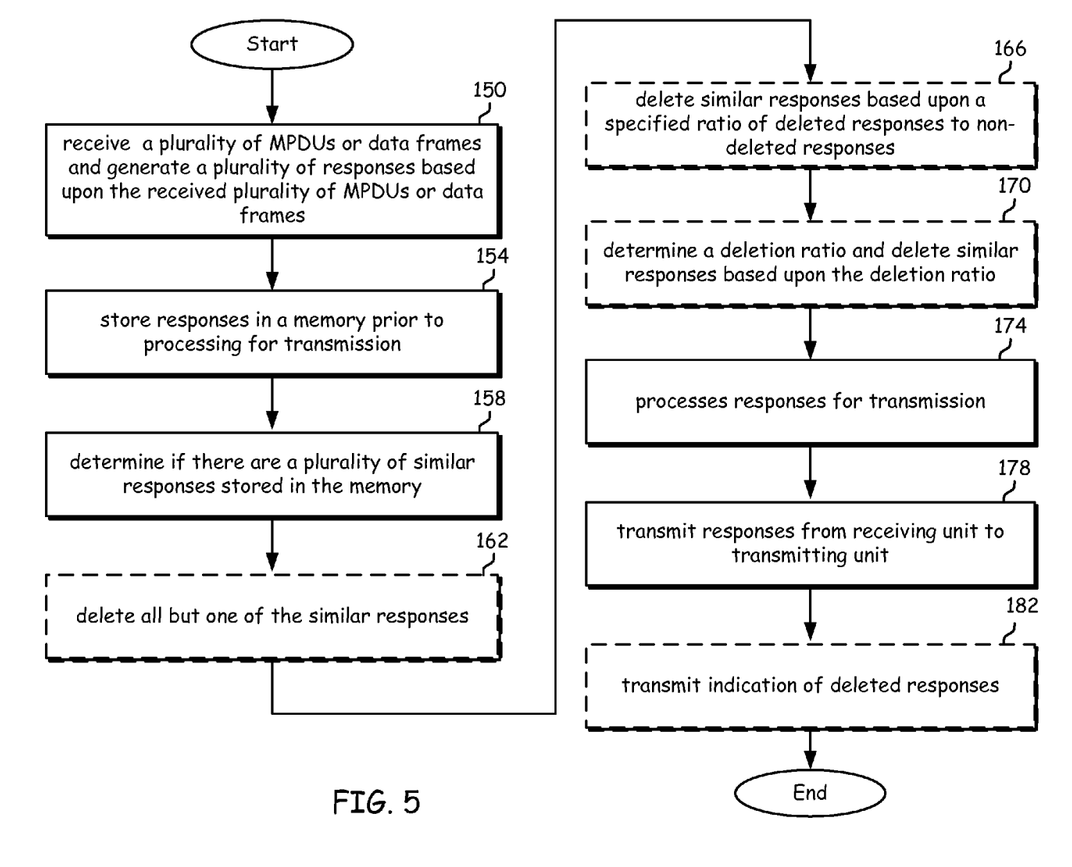
FIG. 5 is a flow chart illustrating a method of operation according to one embodiment of the invention.

FIG. 5 is a flow chart illustrating a method according to one embodiment of the invention. The method of FIG. 5 includes initially received a plurality of MPDUs or data frames and generating a plurality of responses based upon the received plurality of MPDUs or data frames (step 150). The responses are then stored in a memory (step 154). The memory is, in one embodiment, a memory utilized to queue outgoing responses. Subsequently, the method includes determining if there are a plurality of similar responses stored in memory (step 158). In one embodiment, the method includes if the responses have no data in a data field and if there are a plurality of such responses. For example, in this embodiment, if the responses are ACKs with data, they are not evaluated for deletion. If, on the other hand, the responses are ACKs with a data length setting of zero or otherwise have an indication in any form that the ACK has no associated data, then the ACKs are deleted according to the logic for deletion (all but most recent, according to a fixed ratio, or according to a determined ratio).

Thus, once it has been determined that there are similar responses without data that may be deleted, the method includes deleting the redundant or useless responses according to a plurality of options. First, all but one of the similar responses are deleted (step 162). Alternatively, similar or redundant responses are deleted according to a specified ratio (step 166). In yet another approach, a deletion ratio is determined and the responses are deleted according to the deletion ratio (step 170). In the described embodiments of the invention, the most recent response is kept and older responses are deleted. The relative timing of the responses may be determined by examining their order in the queue (last in is most recent) or by evaluating an associated sequence number for each of the responses.

Thereafter, the method includes processing responses for transmission (step 174) and transmitting the responses from the receiving unit to the transmitting unit (step 178). Finally, in one embodiment, the invention includes transmitting an indication of the deleted responses so that the transmitting unit may verify that associated frames or MPDUs associated with the deleted responses were received. For example, this step includes, in one embodiment, sending an indication of deleted sequence numbers.

In an alternate embodiment, the sequence number of the transmitted response is transmitted therewith thereby enabling the transmitting device to determine that a number of responses were deleted to enable it to determine that responses were initially generated but then deleted for the associated MPDUs or data frames. Generally, this embodiment is for applications other than TCP based systems for which ACKs are generated as the responses. In a TCP based system, the transmission of a most recent ACK operates to inform the transmitting device that prior frames/MPDUs were correctly received.

Figure 6:
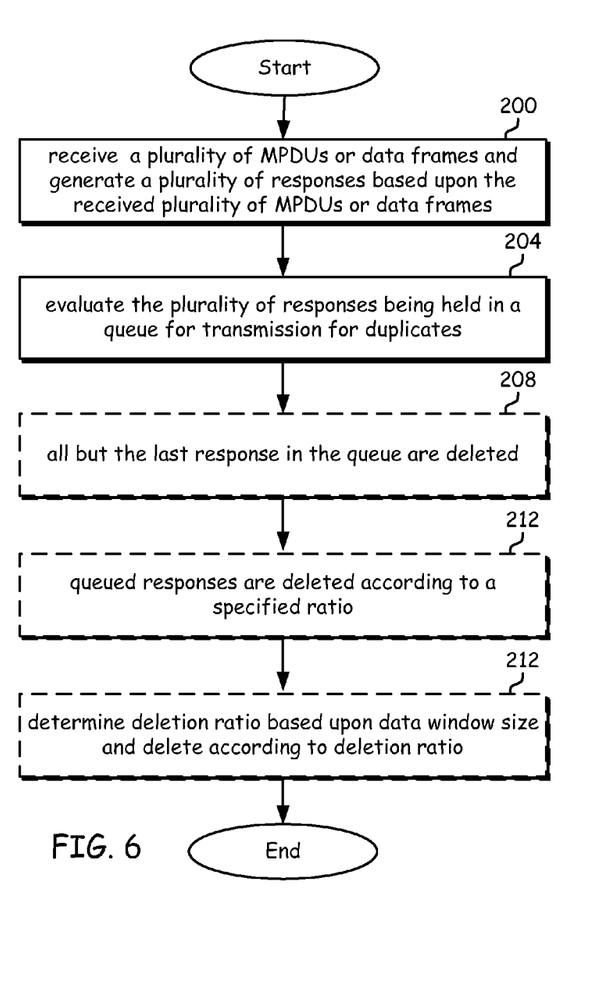
FIG. 6 is a flow chart illustrating a method of operation according to one embodiment of the invention.

FIG. 6 is a flow chart illustrating a method of operation according to one embodiment of the invention. A receiver initially receives a plurality of MPDUs or data frames and generates a plurality of responses based upon the received plurality of MPDUs or data frames (step 200). In one embodiment, one response is generated for every two MPDUs, which, in the described embodiment, are about 1500 bytes of data each in size. The method then includes evaluating the plurality of responses being held in a queue for transmission for duplicate or redundant responses (step 204). In one embodiment, all but the last response in the queue are deleted (step 208).

In an alternate embodiment, queued responses are deleted according to a specified ratio (step 212). For example, a ratio of 20:1 or 16:1 may be used (number deleted for every one that is kept). In yet another alternate embodiment, a dynamic ratio is determined based upon data window size (step 216). The dynamic ratio may be determined according to a plurality of factors including transmission data rates, source and/or destination device types or IDs in addition to the window size. It is understood, of course, that window size may implicitly include these factors. As a general rule, an acknowledge should be sent, however, for a specified portion of the window size since transmitting devices will cease transmitting or will start re-transmitting previously sent data if an acknowledge signal or response signal is not received after a specified amount of data has been transmitted.

In one application of the embodiments of the present invention, one ACK is generated for every two packets. Thus, if a data window size is specified to be 1 Mb, and if a queue is defined to store aggregated ACKs for approximately, ⅛ of such a data window size, then the queue for aggregated ACKs is approximately equal to large enough to store ACKs for 128 kb of data. Thus, assuming 1 ACK for two packets, 128 kb equates to approximately 90 packets. As such, a queue that holds 45 ACKs would be required if such queue were intended to aggregate potentially all ACKs for ⅛ of the total data window size.

In a MIMO environment, where many ACKs can be generated based on the high data rates provided by the multiple transmission streams, a queue that can hold at least 20 aggregated ACKs is used in many embodiments of the invention under the operating parameters utilized above. It is important to note, however, that the queue size for aggregating ACKs depends not only on data window sizes and associated parameters as described above, but also upon ACK to data transmission ratios.

For example, for the same window size of 1 Mb in the example above, if only one ACK is generated for every 10 packets instead of every two packets, a smaller aggregated queue size could be used if all other considerations are the same as above. Generally, however, according to the embodiments of the present invention, a queue for aggregating ACKs (or any signal that may be aggregated) is utilized. A minimum aggregate queue size is 2. Along these lines, the inventor herein has realized that even aggregating only two ACKS and deleting one redundant ACK provides substantial gains in performance and efficiency. More discussion regarding aggregate queue size and ACK ratios will be provided below in relation to FIG. 7.

The window size and ratio of deleted responses depend largely on a maximum amount of data that a transmitter will send without receiving the expected response. As an additional consideration, one embodiment contemplates also evaluating a need for sending redundant responses to achieve desired transmission robustness (to account for transmission errors due to factors such as noise). It should also be noted that the embodiments of the invention as described herein may also be applied to many different applications. For example, at least one embodiment may be applied to any device, which aggregates before sending. For example, Gigabit Ethernet systems implement so called "Jumbo" frames (normally up to 8 k or 6 regular frames). Along these lines, the concepts for improving efficiency through the management and use of aggregation techniques as described in relation to the various embodiments of the invention are likely to be used by 10-Gigabit Ethernet systems.

Figure 7:
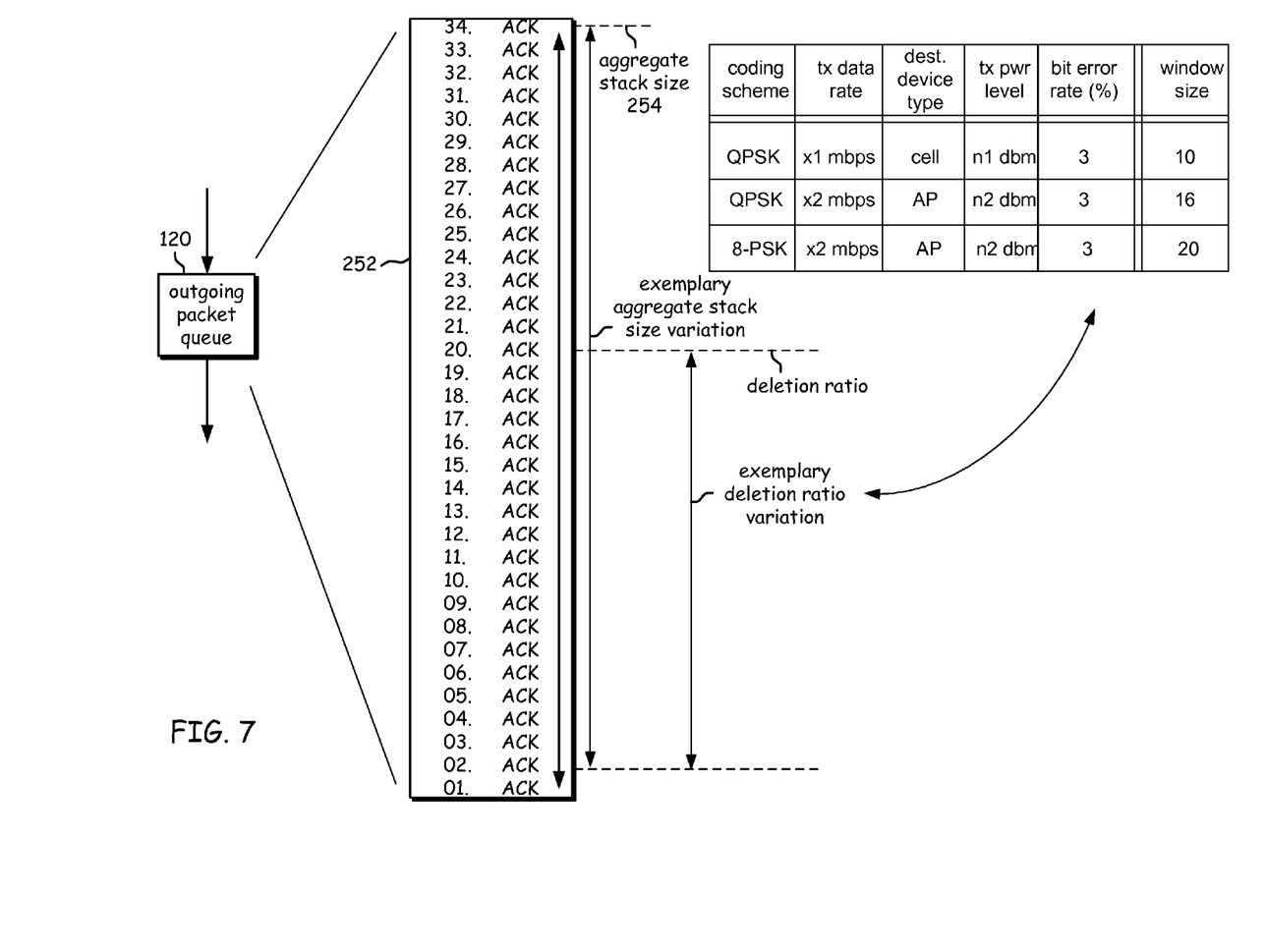
FIG. 7 is a diagram that illustrates queued data within an outgoing packet queue and operation thereof according to one embodiment of the invention.

FIG. 7 is a diagram that illustrates queued data within an outgoing packet queue and operation thereof according to one embodiment of the invention. Referring to FIG. 7, an outgoing packet queue 250 includes a portion 252 that comprises an aggregate stack of aggregated ACKs that are to be transmitted from a radio receiver front end of a receiving device to a transmitting device. In examining portion 252, an aggregate stack size 254 is shown for portion 252. As may be seen, a minimum aggregate stack size is 2 while a maximum of 34 is shown. It should be understood that the minimum of 2 is a true number while the maximum of 34 is exemplary. In alternate embodiments, a larger maximum may be utilized. As discussed above, the maximum aggregate stack size is based upon data window size and upon the number of ACKs or other aggregated signal generated for a specified amount of data. Thus, for example, the maximum aggregate stacks size may be any where in the range of 40 to 100. For the embodiments of the present invention and associated applications in a MIMO environment, the present embodiments particularly include aggregate stacks sizes ranging from 16-20. Because, however, even an aggregate stack size of 2 with a deletion ratio equal to 2 provides substantial performance benefits, FIG. 7 illustrates the aggregate stack size ranging from 2 to 20.

FIG. 7 further illustrates a plurality of factors that may be evaluated by logic within a device for setting a deletion ratio of aggregated signals such as ACKs. Typically, the window size depends upon transmission data rates as shown in the column labeled "tx data rate". The deletion ratio may also be determined by evaluating one or more of the coding scheme, device type, transmission power level, bit error rate, and other such parameters. It is noteworthy that many of these parameters are related to transmission speed. For example, constellation coding schemes correlate to relative transmission speeds. Power levels and bit error rates also relate to transmission speeds. Higher power equates to less interference and lower bit error rates. Bit error rates reflect channel quality and, therefore, at least partially indicate interference conditions. Finally, device type also provides some indication as some devices are capable to operate at much higher transmission rates than others (e.g., access point (AP) versus cell phone). Finally, while not explicitly shown here, in one embodiment, less than the specified ratio of ACKs may be deleted if a specified amount of time has elapsed since a last ACK was transmitted from the receiving device to the transmitting device. While a very large range of deletion ratios may be defined, for example, from 2 to 100, embodiments of the present invention include deletion ratios in the range of 2-20. More specifically, in one embodiment, the deletion ratio ranges from 8 to 16. In another embodiment, the deletion ratio ranges to 20. In yet other embodiments, fixed (non-dynamic) deletion ratios are used in which the deletion ratios equal one of 2, 8, 16, and 20. In no case, however, may the deletion ratio exceed the size of the aggregate stack size.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. For example, while many embodiments described herein included wireless radio transceivers, the methods and concepts of the present invention may be readily applied within wired networks as well whenever a transmitting device aggregates outgoing signals while waiting to transmit. As may be seen, therefore, the described embodiments may be modified in many different ways without departing from the scope or teachings of the invention.

The invention claimed is:

1. A method for hand shaking, comprising:
storing a response to a received frame in a memory;
deleting one or more redundant responses; and
transmitting the response and an indication of sequence numbers of the one or more deleted redundant responses.

2. The method according to claim 1 further comprising:
determining redundant responses for deletion by evaluating one of a sequence number or an acknowledgment number.

3. The method according to claim 1 wherein only the most recent response is kept.

4. The method according to claim 1 wherein responses are deleted according to a ratio.

5. The method according to claim 1 further comprising:
determining redundant responses for deletion by determining a ratio of responses to be deleted based upon at least one of: a queue size of the stored responses, a device ID and a data throughput rate.

6. The method of claim 1 further including transmitting the response to the transmitting device of the received frame.

7. A communications device, comprising:
a transceiver configured to:
generate a stack of aggregated responses to be transmitted to a device transmitting communication signals to the transceiver;
delete one or more redundant responses from the stack of aggregated responses;
transmit at least one of the aggregated responses to the device transmitting the communication signals and an identification of the one or more deleted redundant responses, wherein the identification of the one or more deleted redundant responses includes an indication of sequence numbers of the one or more deleted redundant responses.

8. The communication device of claim 7 further comprising:
radio front end circuitry operable to transmit and receive radio frequency communication signals, wherein the front end circuitry is operable to produce ingoing communication signals to a baseband processor based upon received radio frequency signals and is further operable to transmit radio frequency signals based upon outgoing communication signals received from the baseband processor.

9. The communication device of claim 7 wherein the transceiver determines a deletion ratio for deleting redundant responses within the stack of aggregated responses.

10. The communication device of claim 9 wherein the transceiver determines the deletion ratio based upon at least one of a coding scheme, a transmission data rate, a destination device type, a transmission power level, a transmission error indicator, or a parameter related to transmission data rate.

11. The communication device of claim 9 wherein the transceiver deletes redundant responses when the deletion ratio is not exceeded.

12. The communication device of claim 9 wherein the transceiver deletes one or more of the redundant responses when a specified amount of time has elapsed since a last response was transmitted from the transceiver to a transmitting device.

13. A communication device, comprising:
a transceiver configured to:
generate an acknowledgement frame in response to a received frame in a stream of transmission control protocol (TCP) traffic;
store the acknowledgement frame in an outgoing packet queue;
examine the outgoing packet queue for one or more previous acknowledgement frames having no data in a data field and associated with the TCP traffic stream;
delete the one or more previous acknowledgement frames having no data in a data field and associated with the TCP traffic stream from the outgoing packet queue; and
transmit the acknowledgement frame with an indication of sequence numbers of the one or more deleted previous acknowledgement frames.

14. The communication device of claim 13, wherein the transceiver is operable to:
receive the received frame in the stream of TCP traffic from a transmitting device; and
transmit the acknowledgement frame with an indication of sequence numbers of the one or more deleted previous acknowledgement frames to the transmitting device.

15. The communication device of claim 13, wherein the transceiver is operable to:
   determine a deletion ratio; and
   delete the one or more previous acknowledgement frames having no data in a data field and associated with the TCP traffic stream from the outgoing packet queue using the deletion ratio.

16. The communication device of claim 15, wherein the transceiver is operable to determine the deletion ratio using at least one of: transmission power level, destination device type, bit error rate, coding type and transmission data rate.

17. The communication device of claim 15, wherein the transceiver is operable to determine the deletion ratio dynamically using a data window size.

18. The communication device of claim 15, wherein the transceiver is operable to:
   delete the one or more previous acknowledgement frames having no data in a data field and associated with the TCP traffic stream from the outgoing packet queue when the deletion ratio is not exceeded.

19. The communication device of claim 13, further comprising:
   radio front end circuitry operable to transmit and receive radio frequency communication signals, wherein the front end circuitry is operable to produce ingoing communication signals to a baseband processor based upon received radio frequency signals and is further operable to transmit radio frequency signals based upon outgoing communication signals received from the baseband processor.

20. The communication device of claim 15, wherein the deletion ratio is a ratio of deleted acknowledgement frames associated with the TCP traffic stream to retained acknowledgement frames associated with the TCP traffic.

* * * * *